United States Patent
Rico Alvarino et al.

(10) Patent No.: US 11,343,824 B2
(45) Date of Patent: May 24, 2022

(54) CARRIER SWITCHING AND ANTENNA SWITCHING FOR A TARGET CARRIER COMBINATION

(71) Applicant: QUALCOMM Incorporated, San Diego, CA (US)

(72) Inventors: Alberto Rico Alvarino, San Diego, CA (US); Alexandros Manolakos, San Diego, CA (US); Umesh Phuyal, San Diego, CA (US); Le Liu, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/521,186

(22) Filed: Jul. 24, 2019

(65) Prior Publication Data

US 2020/0045685 A1 Feb. 6, 2020

(30) Foreign Application Priority Data

Aug. 1, 2018 (GR) ............................... 20180100362

(51) Int. Cl.
*H04W 72/04* (2009.01)
*H04L 5/00* (2006.01)

(52) U.S. Cl.
CPC ......... *H04W 72/048* (2013.01); *H04L 5/0048* (2013.01); *H04W 72/0453* (2013.01)

(58) Field of Classification Search
None
See application file for complete search history.

(56) References Cited

U.S. PATENT DOCUMENTS

| 2012/0213154 | A1* | 8/2012 | Gaal | H04B 7/061 370/328 |
| 2012/0257564 | A1* | 10/2012 | Kim | H04W 4/06 370/312 |
| 2013/0010659 | A1* | 1/2013 | Chen | H04L 5/001 370/280 |

(Continued)

OTHER PUBLICATIONS

Qualcomm Incorporated et al., "UE Capabilities for Tx Antenna Selection", 3GPP Draft, Dec. 14, 2017 (Dec. 14, 2017), XP051670707, 48 Pages, URL:http://www.3gpp.org/ftp/tsg%5Fran/TSG%5FRAN/TSGR%5F78/Docs/RP%2D172622%2Ezip [retrieved on Dec. 14, 2017] p. 1-p. 3 p. 38 p. 42. (Year: 2017).*

(Continued)

*Primary Examiner* — Otis L Thompson, Jr.
(74) *Attorney, Agent, or Firm* — Harrity & Harrity, LLP

(57) ABSTRACT

Various aspects of the present disclosure generally relate to wireless communication. In some aspects, a base station may receive information identifying one or more antenna switching capabilities and one or more carrier switching capabilities for a user equipment (UE), wherein the UE is associated with a baseline carrier combination; and determine an antenna switching capability for a target carrier combination based at least in part on the one or more antenna switching capabilities or the one or more carrier switching capabilities, wherein the target carrier combination is different than the baseline carrier combination. Numerous other aspects are provided.

30 Claims, 6 Drawing Sheets

(56) References Cited

U.S. PATENT DOCUMENTS

| | | | |
|---|---|---|---|
| 2016/0143035 A1* | 5/2016 | Xue | H04W 72/048 370/329 |
| 2017/0279580 A1 | 9/2017 | Chen et al. | |
| 2017/0302419 A1* | 10/2017 | Liu | H04L 5/0082 |
| 2019/0044678 A1* | 2/2019 | Liu | H04L 5/0098 |
| 2020/0068534 A1* | 2/2020 | Li | H04W 72/12 |
| 2020/0229213 A1* | 7/2020 | Han | H04W 72/1257 |

OTHER PUBLICATIONS

Qualcomm Incorporated: "SRS Antenna Switching for 1T4R and 2T4R", 3GPP Draft; Apr. 15, 2018, XP051427507, 19 pages, URL: http://www.3gpp.org/ftp/Meetings%5F3GPP%5FSYNC/RAN1/Docs/ [retrieved on Apr. 15, 2018] the whole document, Section 2, Section 4. (Year: 2018).*
International Search Report and Written Opinion—PCT/US2019/043368—ISA/EPO—Oct. 10, 2019 (184241WO).

\* cited by examiner

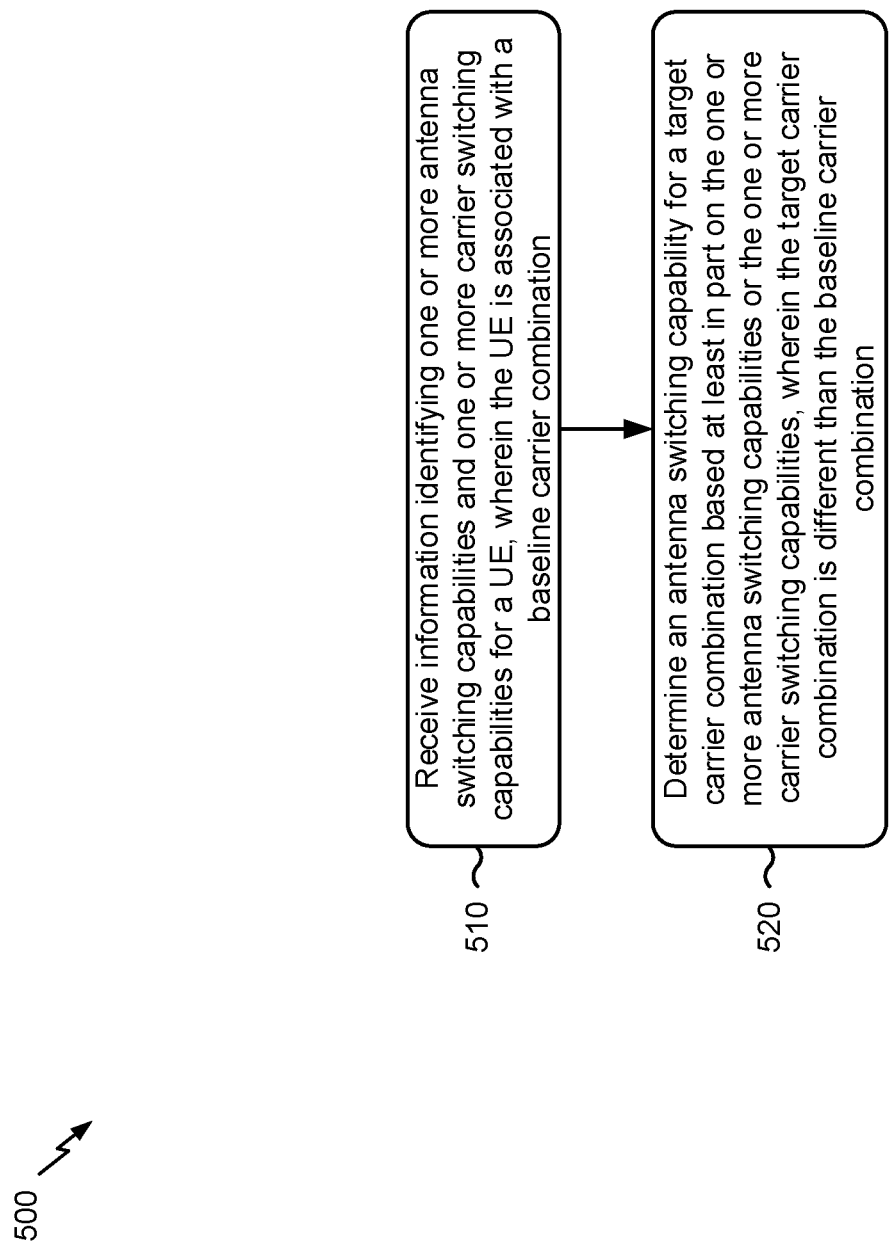

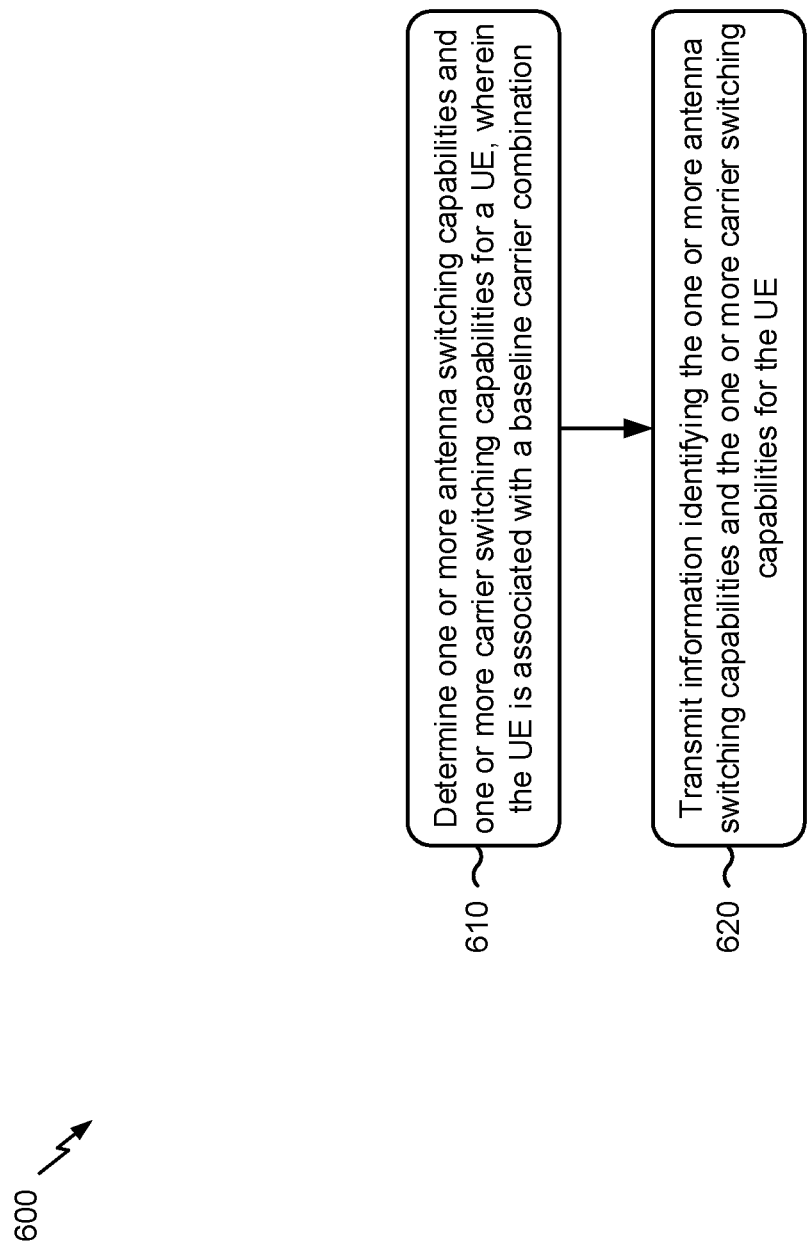

CARRIER SWITCHING AND ANTENNA SWITCHING FOR A TARGET CARRIER COMBINATION

CROSS-REFERENCE TO RELATED APPLICATIONS

This application claims priority to Greek Patent Application No. 20180100362, filed on Aug. 1, 2018, entitled "CARRIER SWITCHING AND ANTENNA SWITCHING FOR A TARGET CARRIER COMBINATION," which is hereby expressly incorporated by reference herein.

FIELD OF THE DISCLOSURE

Aspects of the present disclosure generally relate to wireless communication, and more particularly to techniques and apparatuses for carrier switching and antenna switching for a target carrier combination.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a base station, may include receiving information identifying one or more antenna switching capabilities and one or more carrier switching capabilities for a user equipment (UE), wherein the UE is associated with a baseline carrier combination; and determining an antenna switching capability for a target carrier combination based at least in part on the one or more antenna switching capabilities or the one or more carrier switching capabilities, wherein the target carrier combination is different than the baseline carrier combination.

In some aspects, a base station for wireless communication may include memory and one or more processors operatively coupled to the memory. The memory and the one or more processors may be configured to receive information identifying one or more antenna switching capabilities and one or more carrier switching capabilities for a UE, wherein the UE is associated with a baseline carrier combination; and determine an antenna switching capability for a target carrier combination based at least in part on the one or more antenna switching capabilities or the one or more carrier switching capabilities, wherein the target carrier combination is different than the baseline carrier combination.

In some aspects, a non-transitory computer-readable medium may store one or more instructions for wireless communication. The one or more instructions, when executed by one or more processors of a base station, may cause the one or more processors to receive information identifying one or more antenna switching capabilities and one or more carrier switching capabilities for a UE, wherein the UE is associated with a baseline carrier combination; and determine an antenna switching capability for a target carrier combination based at least in part on the one or more antenna switching capabilities or the one or more carrier switching capabilities, wherein the target carrier combination is different than the baseline carrier combination.

In some aspects, an apparatus for wireless communication may include means for receiving information identifying one or more antenna switching capabilities and one or more carrier switching capabilities for a UE, wherein the UE is associated with a baseline carrier combination; and means for determining an antenna switching capability for a target carrier combination based at least in part on the one or more antenna switching capabilities or the one or more carrier switching capabilities, wherein the target carrier combination is different than the baseline carrier combination.

In some aspects, a method of wireless communication, performed by a UE, may include determining one or more antenna switching capabilities and one or more carrier switching capabilities for the UE, wherein the UE is associated with a baseline carrier combination; and transmitting information identifying the one or more antenna switching capabilities and the one or more carrier switching capabilities for the UE.

In some aspects, a UE for wireless communication may include memory and one or more processors operatively coupled to the memory. The memory and the one or more processors may be configured to determine one or more antenna switching capabilities and one or more carrier switching capabilities for the UE, wherein the UE is associated with a baseline carrier combination; and transmit information identifying the one or more antenna switching capabilities and the one or more carrier switching capabilities for the UE.

In some aspects, a non-transitory computer-readable medium may store one or more instructions for wireless communication. The one or more instructions, when executed by one or more processors of a UE, may cause the one or more processors to determine one or more antenna switching capabilities and one or more carrier switching capabilities for the UE, wherein the UE is associated with a baseline carrier combination; and transmit information identifying the one or more antenna switching capabilities and the one or more carrier switching capabilities for the UE.

In some aspects, an apparatus for wireless communication may include means for determining one or more antenna switching capabilities and one or more carrier switching capabilities for the apparatus, wherein the apparatus is associated with a baseline carrier combination; and means for transmitting information identifying the one or more antenna switching capabilities and the one or more carrier switching capabilities for the apparatus.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example process performed, for example, by a base station, in accordance with various aspects of the present disclosure.

FIG. 6 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
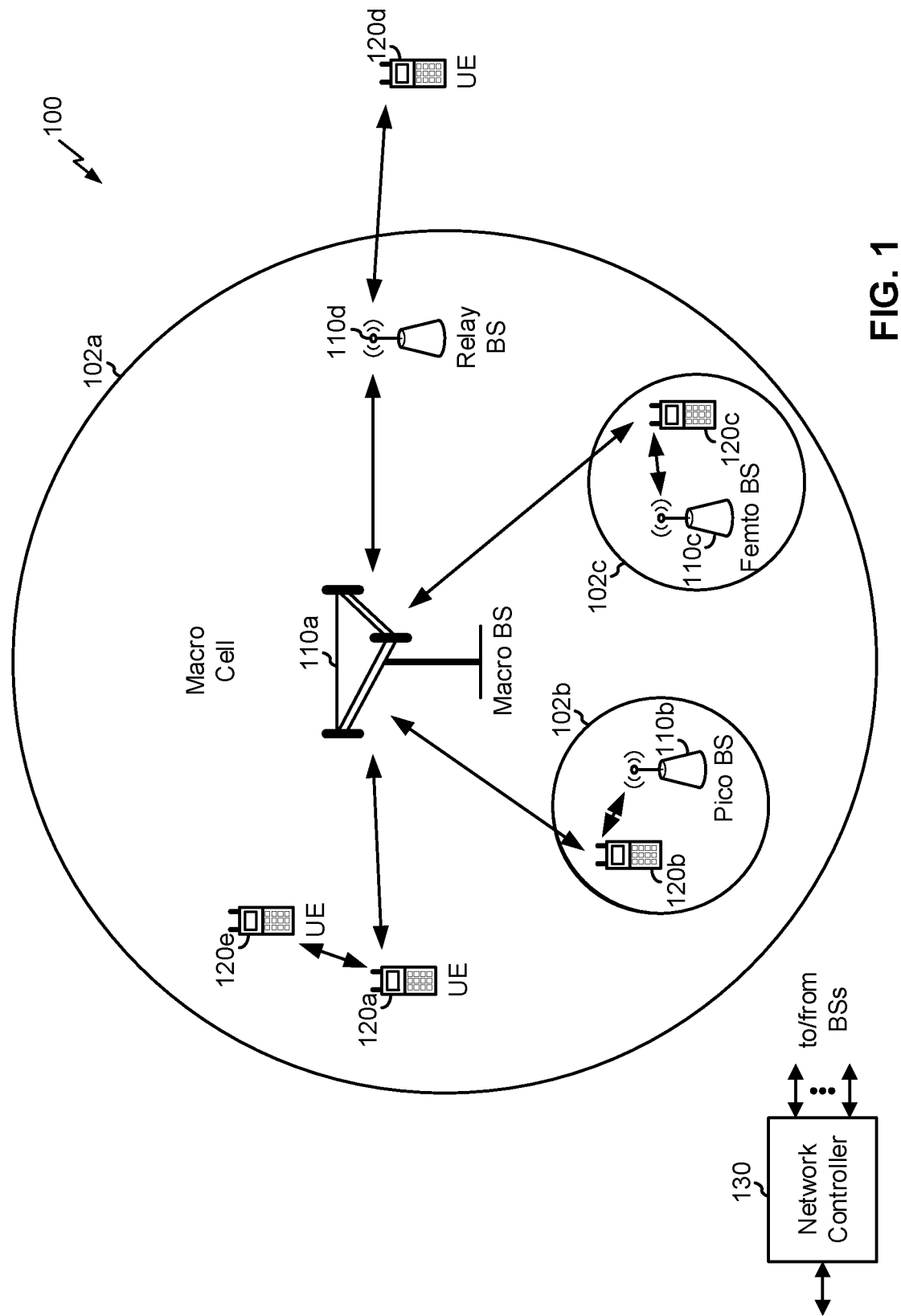
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, a smart meter or sensor, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
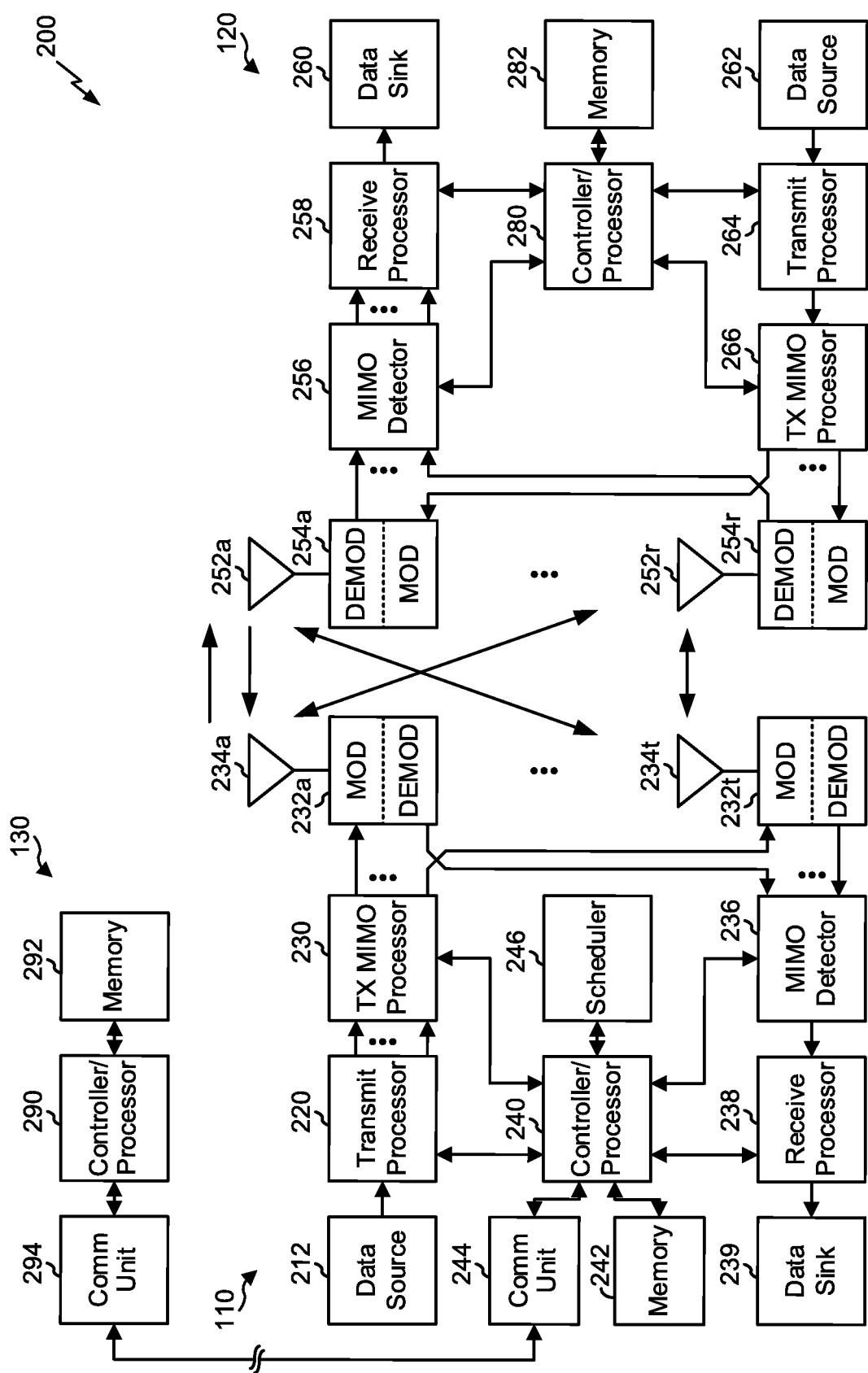
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate)

the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with carrier switching and antenna switching for a target carrier combination, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining one or more antenna switching capabilities and one or more carrier switching capabilities for the UE, wherein the UE is associated with a baseline carrier combination; means for transmitting information identifying the one or more antenna switching capabilities and the one or more carrier switching capabilities for the UE; means for receiving information identifying a target carrier combination for a transmission of the UE; means for determining an antenna switching capability for the target carrier combination; means for determining that the antenna switching capability for the target carrier combination is not identified by the information identifying the one or more antenna switching capabilities; means for determining that antenna switching is not supported for the target carrier combination based at least in part on the antenna switching capability for the target carrier combination not being identified by the information identifying the one or more antenna switching capabilities; means for determining that the antenna switching capability for the target carrier combination is not identified by the information identifying the one or more antenna switching capabilities; means for transmitting information identifying the target carrier combination, wherein the target carrier combination is not supported as the baseline carrier combination for the UE; and/or the like. In some aspects, such means may include one or more components of UE 120 described in connection with FIG. 2.

In some aspects, base station 110 may include means for receiving information identifying one or more antenna switching capabilities and one or more carrier switching capabilities for a user equipment (UE), wherein the UE is associated with a baseline carrier combination; means for determining an antenna switching capability for a target carrier combination based at least in part on the one or more antenna switching capabilities or the one or more carrier switching capabilities, wherein the target carrier combination is different than the baseline carrier combination; means for determining that the antenna switching capability for the target carrier combination is not identified by the information identifying the one or more antenna switching capabilities; means for determining that antenna switching is not supported for the target carrier combination based at least in part on the antenna switching capability for the target carrier combination not being identified by the information identifying the one or more antenna switching capabilities; means for determining that the antenna switching capability for the target carrier combination is not identified by the information identifying the one or more antenna switching capabilities, wherein the antenna switching capability for the target carrier combination corresponds to the antenna switching capability for when the target carrier combination is to be used as the baseline carrier combination; means for receiving information identifying the target carrier combination, wherein the target carrier combination is not supported as the baseline carrier combination for the UE; means for receiving information identifying a baseline carrier configuration, wherein the baseline carrier configuration identifies one or more first carriers configured for downlink communication and not for uplink communication, and wherein the baseline carrier configuration identifies one or more second carriers configured for uplink communication and downlink communication; means for transmitting information identifying a switching configuration; and/or the like. In some aspects, such means may include one or more components of base station 110 described in connection with FIG. 2.

As indicated above, FIG. 2 is provided as an example. Other examples may differ from what is described with regard to FIG. 2.

In a time division duplexed (TDD) multiple-input multiple-output (MIMO) network, a reference signal (e.g., a sounding reference signal (SRS) and/or the like) may be used for reciprocity-based beamforming. A UE may transmit the reference signal on the uplink. A BS may estimate the channel using the reference signal, and may perform beamforming or precoding for the downlink based at least in part on the estimated channel.

A UE may have transmit components and receive components, such as antennas, transmit chains, receive chains, radio frequency (RF) front-ends, and/or the like. In many cases, the UE may have asymmetric transmit components and receive components. As one example, a UE may have multiple antennas and a single transmit chain, meaning that the UE can only transmit using one of the multiple antennas. As a second example, the UE may support 3 bands for downlink carrier aggregation, but may have a single transmit chain, meaning that only one of the 3 bands can be used for uplink transmission. This asymmetry may limit the reciprocity-based operation, since the BS may not be able to estimate all channels. This may be because the BS may only be able to estimate a channel in which the UE can transmit a reference signal. Two approaches may be used to transmit reference signals in different channels: antenna switching or carrier switching. Each is described in turn below.

Antenna switching is a procedure for switching the antenna used by the UE to transmit a signal (e.g., a physical channel, a reference signal, and/or the like). For example, the UE may transmit a signal using multiple, different antennas by switching between the multiple, different antennas. The UE may perform antenna switching based at least in part on an antenna switching capability (sometimes referred to herein as a capability for antenna switching). For example, the antenna switching capability may be based at least in part on a radio frequency or switch architecture of the UE, an example of which is described in connection with FIG. 4. In some aspects, the antenna switching band capability may be on a per-band basis, and may indicate which bands support antenna switching on the uplink, which bands switch together on the uplink, which bands are interrupted on the downlink when the uplink is switched, which bands support 2-way antenna switching or 4-way antenna switching (e.g., 1 transmit and 2 receive antennas, 1 transmit and 4 receive antennas, 2 transmit and 4 receive antennas, and/or the like). The UE may signal antenna switching capabilities for different band combinations. For example, a band combination of Band 1, Band 2, Band 3, and Band 4 may be denoted as B1U/B2/B3U/B4, wherein B1 and B3 are associated with uplinks (indicated by the U associated with B1 and B3). For example, the UE may signal different antenna switching capabilities for B1U/B2/B3U/B4, B1U/B2/B5U/B4, and B1U/B2/B3/B4.

The UE may perform carrier switching in accordance with a carrier switching capability (sometimes referred to herein as a capability for carrier switching). For example, the carrier switching capability may indicate, per band in a band combination, a switching time to switch from a carrier on one band to a carrier on another band of the band combination. In some aspects, the switching time may be for transmission of a reference signal. For example, consider a band combination of B1/B2/B3/B4 (uplinks not shown). In this case, the carrier switching capability may indicate that the uplink of B1 can switch to B3 with an uplink interruption of 1 symbol (e.g., 1 OFDM symbol) and no downlink interruption, that the uplink of B1 can switch to B4 with an uplink interruption of 2 symbols and a downlink interruption of 1 symbol, and so on. In some aspects, carrier switching capabilities may be provided for each switchable band of the band combination (e.g., each possible pairing of source band and target band), and/or may be provided for multiple band combinations. "Carrier combination" is used interchangeably with "band combination" herein.

An issue may arise when the UE is to perform contemporaneous carrier switching and antenna switching. For example, the UE may switch an uplink of one or more bands (e.g., to transmit a physical channel or signal such as an SRS) in accordance with a carrier switching capability. This may be considered as transitioning from a baseline carrier combination to a target carrier combination. The baseline carrier combination may be associated with a different antenna switching capability than the target carrier combination. Thus, it may not be clear how to determine the antenna switching capability when the UE performs carrier switching.

Some techniques and apparatuses described herein provide determination of an antenna switching capability based at least in part on a target carrier combination and/or a carrier switching capability. For example, the UE and/or the BS may determine the antenna switching capability for transmission of a reference signal, such as an SRS or a different reference signal. In some aspects, the UE and/or the BS may determine the antenna switching capability as an antenna switching capability of the target carrier combination. In some aspects, the UE and/or the BS may determine the antenna switching capability using an explicit or implicit indication of the antenna switching capability for the target carrier combination. In some aspects, the UE and/or the BS may determine the antenna switching capability based at least in part on a downlink interruption indicated by the carrier switching capability. Numerous other aspects are described herein. By determining the antenna switching capability for the target carrier combination, the UE and/or the BS can more efficiently utilize transmit/receive resources, thereby increasing throughput and efficiency of communication between the UE and the BS. For example, the UE and/or the BS may be able to more efficiently schedule reference signals to be transmitted by the UE, thereby increasing the number of channels that can be estimated for the BS and/or reducing a throughput impact of performing estimation.

Figure 3:
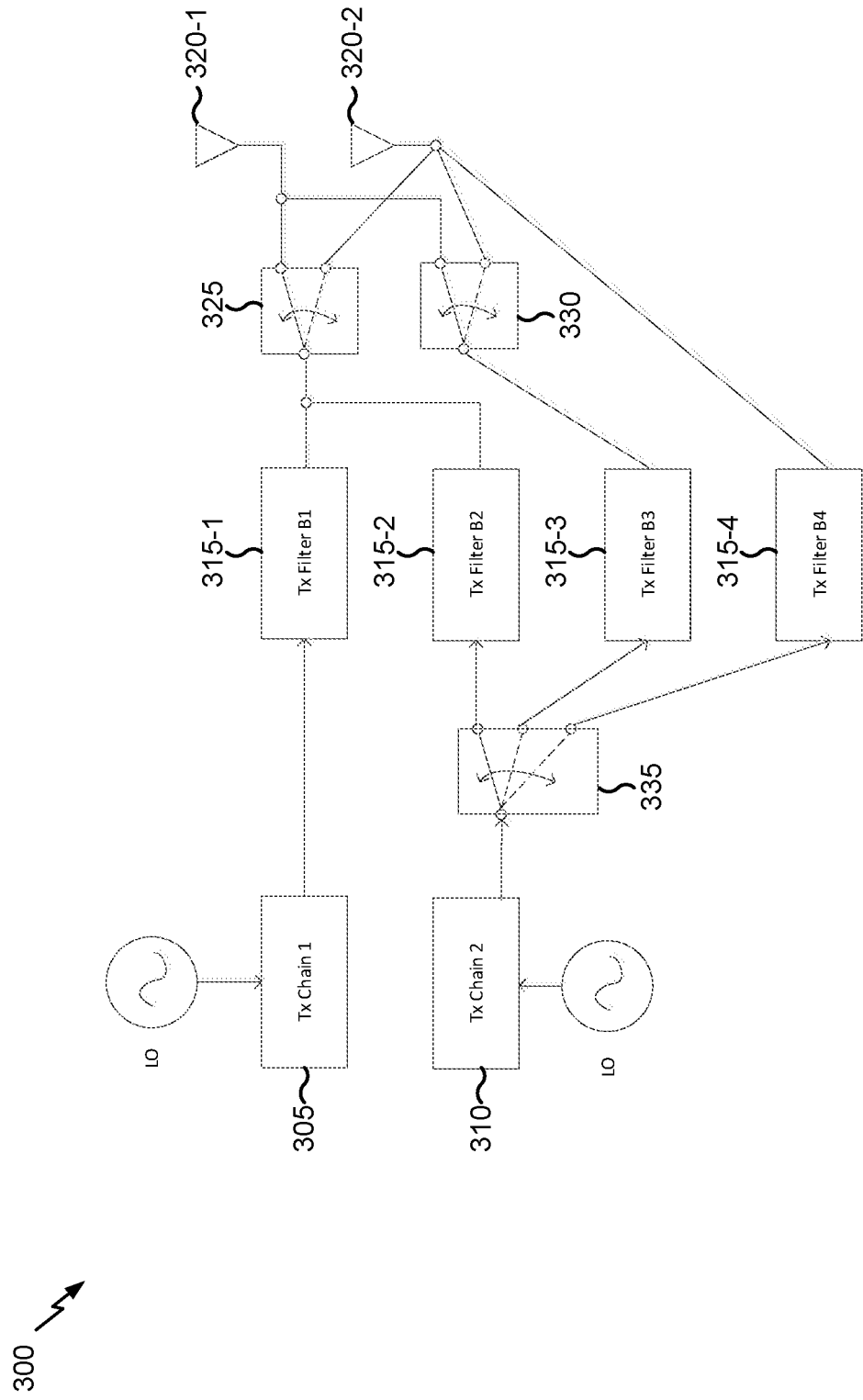
FIG. 3 is a diagram illustrating an example of a radio frequency architecture for a user equipment, in accordance with various aspects of the present disclosure.

FIG. 3 is a diagram illustrating an example 300 of a radio frequency architecture for a user equipment, in accordance with various aspects of the present disclosure. Example 300 is provided by way of illustration only, and other configurations of transmit chains, filters, switches, and antennas are possible and contemplated herein. In other words, the radio frequency architecture of the user equipment described herein is not limited to the architecture shown in FIG. 3.

As shown in FIG. 3, a UE (e.g., UE 120) may include a first transmit chain 305 (shown as Tx Chain 1) and a second transmit chain 310 (shown as Tx Chain 2). As further shown, each transmit chain is associated with or includes a respective local oscillator (LO). As further shown, the UE 120 may include respective transmit (Tx) filters 315-1 through 315-4, which may be associated with bands or carriers B1 through B4, respectively. The UE may transmit signals using antennas 320-1 and 320-2. As further shown, the UE may be associated with switches 325, 330, and 335.

As can be seen, switch 325 may switch an input (e.g., the signals of transmit filter 315-1 and 315-2) between antenna 320-1 and 320-2. Therefore, the bands associated with transmit filters 315-1 and 315-2 switch together, since both are controlled by the same switch 325. Furthermore, switch 330 may switch an input (e.g., transmit filter 315-3) between antenna 320-1 and antenna 320-2. Still further, switch 335 may switch transmit chain 310 between transmit filters 315-2, 315-3, and 315-4. Notably, transmit filter 315-4 cannot switch from antenna 320-2, so transmit filter 315-4 can only be used with antenna 320-2.

The supported band combinations for example 300 may include B1/B2 (since both can switch between antenna 320-1 and 320-2), B1/B3 (since B1 and B3 can switch separately between antenna 320-1 and 320-2), and B1/B4 (since B1 can switch between antenna 320-1 and 320-2, and B4 cannot switch). Here, the band combinations include two bands because there are two transmit chains. The first transmit chain may be dedicated to B1 and the second transmit chain may be switched between B2, B3, and B4 by switch 335. In the case of B1/B4, the corresponding antenna switching capability may indicate that antenna switching is not supported for B4 and that antenna switching is supported for B1 between antennas 320-1 and 320-2. A carrier switching capability, for example 300, might indicate uplink and/or downlink interruptions for switching between bands B2, B3, and B4.

An issue may arise when an uplink (for example, the uplink of transmit chain 310) is switched from one band to another band. For example, the band combination B1/B2 is associated with a different antenna switching capability than the band combination B1/B4. If an uplink is to be temporarily switched from B2 to B4 (e.g., for transmission of a reference signal), the UE and a BS may need to be able to signal and/or determine an appropriate antenna switching capability for the target band combination of B1/B4. Various techniques for achieving this are described in connection with FIG. 4, below.

As indicated above, FIG. 3 is provided as an example. Other examples may differ from what is described with respect to FIG. 3.

Figure 4:
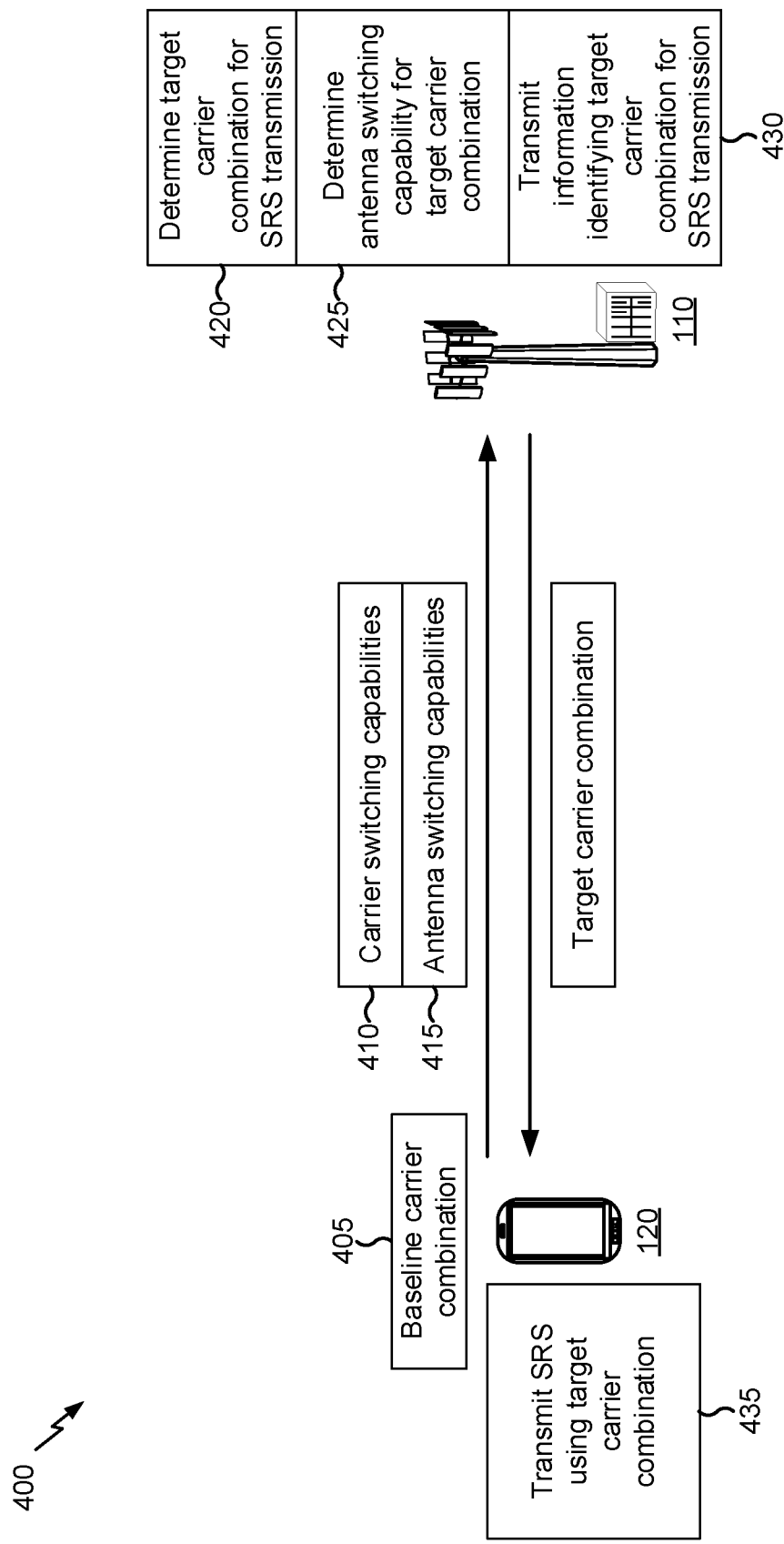
FIG. 4 is a diagram illustrating an example of determining an antenna switching capability for a target carrier combination, in accordance with various aspects of the present disclosure.

FIG. 4 is a diagram illustrating an example 400 of determining an antenna switching capability for a target carrier combination, in accordance with various aspects of the present disclosure. As shown, FIG. 4 includes a BS 110 and a UE 120. As shown by reference number 405, the UE 120 may be associated with a baseline carrier combination. The baseline carrier combination may identify a set of carriers that the UE 120 uses to communicate with the BS 110. For example, the UE 120 may use the baseline carrier combination as a default carrier combination and/or the like. In some aspects, the baseline carrier combination may be a carrier combination without switching (e.g., when the UE 120 is not to switch to transmit a reference signal). In some aspects, the UE 120 may switch to a target carrier combination. For example, the UE 120 may switch to the target carrier combination to transmit a physical channel or signal (e.g., a reference signal), and may switch back to the baseline carrier combination after transmitting the physical channel or signal. In some aspects, the UE 120 may use the target carrier combination for a shorter period of time than the baseline carrier combination. For example, the UE 120 may use the target carrier combination for a single subframe, a part of a subframe, a set of subframes, a certain number of transmission time intervals (TTIs), and/or the like.

As shown by reference number 410, the UE 120 may provide information identifying carrier switching capabilities of the UE 120. A carrier switching capability may pertain to a carrier combination, and may indicate an uplink and/or downlink interruption associated with switching an uplink of the carrier combination. For example, consider a carrier combination of B1U/B2/B3. In that case, the carrier switching capability may identify uplink interruptions and/or downlink interruptions for switching the uplink of B1 to B2 or B3. In some aspects, the UE 120 may provide information identifying multiple carrier switching capabilities. In some aspects, the UE 120 may provide information identifying carrier switching capabilities for each carrier combination that the UE is configured to use. In some aspects, the carrier switching capabilities may be different for different carrier combinations.

As shown by reference number 415, the UE 120 may provide information identifying antenna switching capabilities of the UE 120. An antenna switching capability may pertain to a carrier combination. Different antenna switching capabilities may be different for different carrier combinations. For example, consider a carrier combination of B1/B2/B3/B4. In that case, and as just one example, the antenna switching capability may indicate the following for each band of the carrier combination:

B1: Switches with B1/self;
B2: Switches with B1;
B3: Null (does not support antenna switching);
B4: DL interrupted by B1 (and B2, since B1 and B2 switch together).

In some aspects, the UE 120 may provide information identifying an antenna switching capability that is for temporarily switching to the target carrier combination. For example, in some cases, the UE 120 may switch to the target carrier combination for a short length of time (e.g., long enough to transmit a reference signal, a single slot, a single subframe, a part of a subframe, and/or the like). In such a case, the antenna switching capability may be different than if the UE 120 were to switch to the target carrier combination as a new baseline carrier combination. This may be based at least in part on processor constraints, retuning time, a set of carrier combinations supported for baseline operation, and/or the like.

In some aspects, the UE 120 may provide information indicating whether an antenna switching capability is associated with a target carrier combination. For example, a carrier combination may have a different antenna switching capability when the carrier combination is a baseline carrier combination than when the carrier combination is a target carrier combination (e.g., a carrier combination to be used for a reference signal transmission, a temporary carrier combination, a carrier combination to be used for a threshold length of time, and/or the like). The BS 110 may use the information indicating whether the antenna switching capability is associated with a target carrier combination to determine an antenna switching capability for the target carrier combination, as described in more detail below.

As shown by reference number 420, the BS 110 may determine a target carrier combination for an SRS transmission. In some aspects, the BS 110 may determine a target carrier combination for a reference signal transmission or another type of transmission of the UE 120. In some aspects, the target carrier combination may be temporary. For example, the UE 120 may switch to the target carrier combination while the UE 120 is to transmit the SRS, then may switch back to the baseline carrier combination. In some aspects, the BS 110 may determine the target carrier combination based at least in part on information identifying carrier combinations associated with the UE 120. For example, the BS 110 may determine the target carrier combination based at least in part on the target carrier combination being one of the carrier combinations associated with the UE 120. As another example, the BS 110 may determine the target carrier combination based at least in part on the target carrier combination being associated with an antenna switching capability.

In some aspects, the target carrier combination may be based at least in part on a baseline carrier configuration. The baseline carrier configuration may identify one or more first carriers and one or more second carriers. A first carrier, for purposes of this description, is a carrier that supports downlink communication and not uplink communication (e.g., a half duplex carrier). A second carrier, for purposes of this description, is a carrier that supports downlink communication and uplink communication (e.g., a full duplex carrier). For example, in the carrier combination B1U/B2/B3U/B4, B1 and B3 are second carriers, and B2 and B4 are first carriers. In some aspects, the baseline carrier configuration may identify a baseline carrier combination.

In some aspects, the target carrier combination may be based at least in part on a switching configuration. The switching configuration may be for transmitting a physical channel or signal (e.g., a reference signal, such as an SRS) in a first carrier (e.g., a DL-only carrier) based at least in part on interrupting a second carrier (e.g., a DL/UL carrier). For example, the uplink of the second carrier may be interrupted to transmit the physical channel or signal in the first carrier. The BS 110 and/or the UE 120 may determine the target carrier combination based at least in part on the baseline carrier combination and/or the switching configuration.

As shown by reference number 425, the BS 110 may determine an antenna switching capability for the target carrier combination. For example, the BS 110 may determine the antenna switching capability based at least in part on the information identifying the antenna switching capabilities and/or the information identifying the carrier switching capabilities. Multiple, different approaches for determining the antenna switching capability are described below.

In some aspects, the BS 110 may determine the antenna switching capability as an antenna switching capability associated with the target carrier combination. For example, assume that the baseline carrier combination is B1U/B2U/B3/B4 and the target carrier combination is B1U/B2/B3U/B4. In that case, the BS 110 may determine the antenna switching capability as the antenna switching capability associated with B1U/B2/B3U/B4. In some aspects, the antenna switching capability for the target carrier combination may be referred to herein as an antenna switching configuration. For example, the BS 110 may determine an antenna switching configuration for the target carrier combination based at least in part on the information identifying the antenna switching capabilities of the UE 120.

In some aspects, the BS 110 may determine that the UE 120 has not provided an antenna switching capability for the target carrier combination. In that case, the BS 110 may determine that the UE 120 does not support antenna switching for the target carrier combination. In some aspects, the BS 110 may transmit a configuration message to the UE 120 based at least in part on the determination. For example, the configuration may specify whether antenna switching is to be used for the target carrier combination.

In some aspects, the BS 110 may determine the antenna switching capability as an antenna switching capability specific to the target carrier combination as a switched carrier combination. For example, the UE 120 may provide antenna switching capabilities for a target carrier combination as a target carrier combination (e.g., for a temporary switch to the target carrier combination) and/or as a baseline carrier combination (e.g., for a switch to the carrier combination as a new baseline carrier combination of the UE 120). As another example, assume that the target carrier combination is B1U/B2/B3U/B4, and assume that the UE 120 provides antenna switching capabilities for the carrier combinations B1U/B2U/B3/B4, B1U/B2/B3U/B4, and B1U/B2/B3U/B4' switched, wherein the second and third antenna switching capabilities are different. Here, "B1U/B2/B3U/B4' switched" is the switched antenna switching capability for the B1U/B2/B3U/B4 carrier combination as a target carrier combination, and "B1U/B2/B3U/B4" is the antenna switching capability for B1U/B2/B3U/B4 as a baseline carrier combination. The BS 110 may identify the antenna switching capability as the switched antenna switching capability associated with B1U/B2/B3U/B4' switched. In some aspects, the BS 110 may determine that no switched antenna switching capability (e.g., B1U/B2/B3U/B4' switched) is associated with the target carrier combination (e.g., B1U/B2/B3U/B4). In that case, the BS 110 may use the "unswitched" antenna switching capability associated with B1U/B2/B3U/B4, or may determine that antenna switching is not supported for B1U/B2/B3U/B4. In some aspects, the BS 110 may transmit a configuration message to the UE 120 based at least in part on the determination. For example, the configuration may specify whether antenna switching is to be used for the target carrier combination.

In some aspects, the BS 110 may determine the antenna switching capability based at least in part on a downlink interruption. For example, in some cases, a carrier switching capability may indicate that one or more bands will be interrupted when switching from a baseline carrier combination to a target carrier combination. This may be particularly likely when the uplink and the downlink of a band share the same phase locked loop (PLL), so that retuning the uplink PLL disrupts the downlink reception. In this case, the BS 110 may determine a carrier combination that does not include the interrupted band or carrier, and may identify an antenna switching capability that corresponds to the carrier combination that does not include the interrupted band or carrier. As an example, assume a baseline carrier combination of B1U/B2U/B3/B4 and a target carrier combination (without excluding interrupted carriers) of B1U/B2/B3U/B4, and assume that the downlink of B2 will be interrupted when switching the uplink of B2 to B3. In that case, the BS 110 may identify a target carrier combination of B1U/B3U/B4, and may identify the antenna switching combination associated with the target carrier combination of B1U/B3U/B4. In some aspects, the BS 110 may transmit a configuration message to the UE 120 based at least in part on the determination. For example, the configuration may specify whether antenna switching is to be used for the target carrier combination.

In some aspects, the target carrier combination may not be supported as a baseline carrier combination. For example, the UE 120 may not support some carrier combinations as baseline carrier combinations (e.g., based at least in part on lack of interest from operators, inordinate testing effort, and/or the like). In some aspects, the UE 120 may provide information indicating which carrier combinations are supported as baseline carrier combinations, which carrier combinations are supported as baseline and target carrier combinations, and/or which carrier combinations are supported only as target carrier combinations. The BS 110 may determine a target carrier combination of the set of carrier combinations that can be used as target carrier combinations of the UE 120, and may determine a carrier switching capability for the target carrier combination, as described in more detail elsewhere herein. In some aspects, the BS 110 may transmit a configuration message to the UE 120 based at least in part on the determination. For example, the configuration may specify whether antenna switching is to be used for the target carrier combination.

In some aspects, the BS 110 may determine the antenna switching capability based at least in part on the baseline carrier combination. For example, in some aspects, the information identifying the antenna switching capability for a target carrier combination may identify a baseline band associated with an uplink of the target carrier combination. In other words, assume that an uplink of B4 is to be switched to B1 in the target carrier combination. In that case, the UE 120 may provide information identifying a carrier combination of B1S(B4)/B2/B3U/B4, which indicates that the uplink of B1 was switched from B4 relative to the baseline carrier combination. Additionally, or alternatively, the UE 120 may provide information identifying a carrier combination of B1S/B2/B3U/B4, which indicates that the uplink of B1 is a switched carrier but does not indicate the corresponding carrier in the baseline carrier combination. In some aspects, the UE 120 may provide an antenna switching capability and/or a carrier switching capability for the carrier combination of B1S(B4)/B2/B3U/B4 and/or B1S/B2/B3U/B4, which the BS 110 may use to determine the antenna switching capability for the target carrier combination. For example, the antenna switching capabilities for a carrier combination that is associated with different baseline carrier combinations may be different for the different baseline carrier combinations. In this way, the UE 120 may provide increased granularity for antenna switching capabilities and/or carrier switching capabilities in comparison to a technique that does not take the baseline carrier combination into account.

As shown by reference number 430, the BS 110 may transmit information identifying the target carrier combination for the SRS transmission. For example, the BS 110 may provide an index value identifying the target carrier combination, configuration information indicating the target carrier combination, an uplink grant indicating to use the target carrier combination, and/or the like. As shown by reference number 435, the UE 120 may transmit a reference signal (e.g., an SRS and/or the like) using the target carrier combination. For example, the UE 120 may switch from the baseline carrier combination to the target carrier combination, may transmit the reference signal, and may switch back to the baseline carrier combination. In this way, the BS 110 and/or the UE 120 may determine the antenna switching capability for a target carrier combination, which enables more efficient resource allocation for transmission of reference signals, thereby improving bandwidth utilization.

As indicated above, FIG. 4 is provided as an example. Other examples may differ from what is described with respect to FIG. 4.

FIG. 5 is a diagram illustrating an example process 500 performed, for example, by a base station, in accordance with various aspects of the present disclosure. Example process 500 is an example where a base station (e.g., BS 110) performs determination of an antenna switching capability for a target carrier combination.

As shown in FIG. 5, in some aspects, process 500 may include receiving information identifying one or more antenna switching capabilities and one or more carrier switching capabilities for a UE, wherein the UE is associated with a baseline carrier combination (block 510). For example, the base station (e.g., using antenna 234, DEMOD 232, MIMO detector 236, receive processor 238, controller/processor 240, and/or the like) may receive information identifying one or more antenna switching capabilities and one or more carrier switching capabilities for a UE (e.g., UE 120). The UE may be associated with a baseline carrier combination (e.g., a configured carrier combination, and/or the like). In some aspects, the UE may provide information identifying one or more carrier combinations, such as the baseline carrier combination, another carrier combination that the UE is capable of using, a carrier combination that can be used for a target carrier combination, a carrier combination that can be used only for a target carrier combination, and/or the like. In some aspects, the UE may report capabilities before configuration of the carrier combinations. For example, the UE may report capabilities of the UE before the UE is configured with the baseline carrier combination, or before carrier aggregation (CA) is configured for the UE.

As shown in FIG. 5, in some aspects, process 500 may include determining an antenna switching capability for a target carrier combination based at least in part on the one or more antenna switching capabilities or the one or more carrier switching capabilities, wherein the target carrier combination is different than the baseline carrier combination (block 520). For example, the base station (e.g., using controller/processor 240 and/or the like) may determine an antenna switching capability for a target carrier combination. In some aspects, the base station may determine the target carrier combination. For example, the base station may select the target carrier combination from a set of carrier combinations supported by the UE based at least in part on the information identifying the one or more carrier switching capabilities. The base station may determine or select, from the one or more antenna switching capabilities, an antenna switching capability or configuration associated with the target carrier combination. In some aspects, the target carrier combination may be different than the baseline carrier combination.

Process 500 may include additional aspects, such as any single aspect or any combination of aspects described below and/or in connection with one or more other processes described elsewhere herein.

In a first aspect, the antenna switching capability for the target carrier combination is identified by the information identifying the one or more antenna switching capabilities. In a second aspect, alone or in combination with the first aspect, the antenna switching capability for the target carrier combination is different when the UE is to temporarily switch to the target carrier combination than when the target carrier combination is to be used as the baseline carrier combination.

In a third aspect, alone or in combination with one or more of the first aspect and the second aspect, the base station may transmit information identifying a baseline carrier configuration, wherein the baseline carrier configuration identifies one or more first carriers configured for downlink communication and not for uplink communication, and wherein the baseline carrier configuration identifies one or more second carriers configured for uplink communication and downlink communication; and transmit information identifying a switching configuration, wherein the switching configuration is for transmitting a physical channel or signal in one or more carriers of the one or more first carriers based at least in part on interrupting one or more carriers of the one or more second carriers, and wherein the target carrier combination is determined based at least in part on one or more of the baseline carrier configuration or the switching configuration.

In a fourth aspect, alone or in combination with one or more of the first through third aspects, the one or more antenna switching capabilities and the one or more carrier switching capabilities are different for different carrier or band combinations, wherein the UE is to temporarily switch to the target carrier combination. The UE may determine that the antenna switching capability for the target carrier combination is not identified by the information identifying the one or more antenna switching capabilities; and determine that antenna switching is not supported for the target carrier combination based at least in part on the antenna switching capability for the target carrier combination not being identified by the information identifying the one or more antenna switching capabilities.

In a fifth aspect, alone or in combination with one or more of the first through fourth aspects, the UE is to temporarily switch to the target carrier combination. The UE (e.g., using controller/processor 280 and/or the like) may determine that the antenna switching capability for the target carrier combination is not identified by the information identifying the one or more antenna switching capabilities, wherein the antenna switching capability for the target carrier combination corresponds to the antenna switching capability for when the target carrier combination is to be used as the baseline carrier combination.

In a sixth aspect, alone or in combination with one or more of the first through fifth aspects, at least one band of the baseline carrier combination is not present in the target carrier combination based at least in part on the one or more carrier switching capabilities indicating that the at least one band is associated with an interruption for the target carrier combination. In some aspects, the interruption is a downlink interruption.

In a seventh aspect, alone or in combination with one or more of the first through sixth aspects, the UE may receive information identifying the target carrier combination, wherein the target carrier combination is not supported as the baseline carrier combination for the UE.

In an eighth aspect, alone or in combination with one or more of the first through seventh aspects, the target carrier combination identifies one or more bands of the target carrier combination as switched relative to the baseline carrier combination, and the antenna switching capability is based at least in part on which bands of the target carrier combination are switched.

In a ninth aspect, alone or in combination with one or more of the first through eighth aspects, the target carrier combination identifies particular bands, of the baseline carrier combination, that correspond to the one or more bands as switched, wherein the antenna switching capability is based at least in part on the particular bands and the one or more bands. In some aspects, the target carrier combination is for transmission of a reference signal.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a diagram illustrating an example process 600 performed, for example, by a UE, in accordance with various aspects of the present disclosure. Example process 600 is an example where a UE (e.g., UE 120) performs determination of an antenna switching capability for a target carrier combination.

As shown in FIG. 6, in some aspects, process 600 may include determining one or more antenna switching capabilities and one or more carrier switching capabilities for a UE, wherein the UE is associated with a baseline carrier combination (block 610). For example, the UE (e.g., using controller/processor 280 and/or the like) may determine one or more antenna switching capabilities and one or more carrier switching capabilities for the UE. In some aspects, the UE may be configured with the one or more antenna switching capabilities and/or the one or more carrier switching capabilities. In some aspects, the UE may determine the one or more antenna switching capabilities and/or the one or more carrier switching capabilities based at least in part on a baseline carrier combination of the UE. In some aspects, this may be an implicit determination. For example, the UE may be configured with this information (e.g., as part of a higher-level operating system of the UE, as part of a vendor configuration of the UE, and/or the like), and this determination may refer to retrieving information identifying the one or more antenna switching capabilities and the one or more carrier switching capabilities from the UE's configuration.

As shown in FIG. 6, in some aspects, process 600 may include transmitting information identifying the one or more antenna switching capabilities and the one or more carrier switching capabilities for the UE (block 620). For example, the UE (e.g., using controller/processor 280, transmit processor 264, TX MIMO processor 266, MOD 254, antenna 252, and/or the like) may transmit information identifying the one or more antenna switching capabilities and the one or more carrier switching capabilities for the UE.

Process 600 may include additional aspects, such as any single aspect or any combination of aspects described below and/or in connection with one or more other processes described elsewhere herein.

In a first aspect, the UE (e.g., using antenna 252, DEMOD 254, MIMO detector 256, receive processor 258, controller/processor 280, and/or the like) may receive information identifying a target carrier combination for a transmission of the UE, and may determine an antenna switching capability for the target carrier combination.

In a second aspect, alone or in combination with the first aspect, the antenna switching capability for the target carrier combination is identified by the information identifying the one or more antenna switching capabilities.

In a third aspect, alone or in combination with one or more of the first aspect and the second aspect, the antenna switching capability for the target carrier combination is different when the UE is to temporarily switch to the target carrier combination than when the target carrier combination is to be used as the baseline carrier combination.

In a fourth aspect, alone or in combination with one or more of the first through third aspects, the UE is to temporarily switch to the target carrier combination. The UE (e.g., using controller/processor 280 and/or the like) may determine that the antenna switching capability for the target carrier combination is not identified by the information identifying the one or more antenna switching capabilities; and determine that antenna switching is not supported for the target carrier combination based at least in part on the antenna switching capability for the target carrier combination not being identified by the information identifying the one or more antenna switching capabilities. In some aspects, this determination may be implicit. For example, the UE may not expect to be configured with a target carrier combination that is incompatible with the antenna switching capabilities and/or carrier switching capabilities of the UE, and may therefore determine an error, a misconfiguration, and/or the like.

In a fourth aspect, alone or in combination with one or more of the first through third aspects, the UE is to temporarily switch to the target carrier combination. The UE (e.g., using controller/processor 280 and/or the like) may determine that the antenna switching capability for the target carrier combination is not identified by the information identifying the one or more antenna switching capabilities, wherein the antenna switching capability for the target carrier combination corresponds to the antenna switching capability for when the target carrier combination is to be used as the baseline carrier combination.

In a fifth aspect, alone or in combination with one or more of the first through fourth aspects, at least one band of the baseline carrier combination is not present in the target carrier combination based at least in part on the one or more carrier switching capabilities indicating that the at least one band is associated with an interruption for the target carrier combination.

In a sixth aspect, alone or in combination with one or more of the first through fifth aspects, the UE (e.g., using controller/processor 280, transmit processor 264, TX MIMO processor 266, MOD 254, antenna 252, and/or the like) may transmit information identifying the target carrier combination, wherein the target carrier combination is not supported as the baseline carrier combination for the UE.

In a seventh aspect, alone or in combination with one or more of the first through sixth aspects, the target carrier combination identifies one or more bands of the target carrier combination as switched relative to the baseline carrier combination, and wherein the antenna switching capability is based at least in part on which bands of the target carrier combination are switched.

In an eighth aspect, alone or in combination with one or more of the first through seventh aspects, the target carrier combination identifies particular bands, of the baseline carrier combination, that correspond to the one or more bands as switched, wherein the antenna switching capability is based at least in part on the particular bands and the one or more bands. In some aspects, the transmission is for a reference signal.

In a ninth aspect, alone or in combination with one or more of the first through eighth aspects, the UE may receive information identifying a baseline carrier configuration, wherein the baseline carrier configuration identifies one or more first carriers configured for downlink communication and not for uplink communication, and wherein the baseline carrier configuration identifies one or more second carriers configured for uplink communication and downlink communication; and receive information identifying a switching configuration, wherein the switching configuration is for the UE to transmit a physical channel or signal in one or more carriers of the one or more first carriers based at least in part on interrupting one or more carriers of the one or more second carriers, and wherein the target carrier combination is determined based at least in part on one or more of the baseline carrier configuration or the switching configuration.

In a tenth aspect, alone or in combination with one or more of the first through ninth aspects, the one or more antenna switching capabilities and the one or more carrier switching capabilities are different for different carrier or band combinations.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise forms disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a base station, comprising:
receiving information identifying one or more antenna switching capabilities and one or more carrier switching capabilities for a user equipment (UE), wherein the UE is associated with a baseline carrier combination; and
determining an antenna switching capability for a target carrier combination based at least in part on the one or more carrier switching capabilities, wherein the target carrier combination is different than the baseline carrier combination.

2. The method of claim 1, wherein the target carrier combination is for transmission of a reference signal.

3. The method of claim 1, wherein the one or more antenna switching capabilities are different for different carrier or band combinations.

4. The method of claim 1, wherein the antenna switching capability for the target carrier combination is identified by the information identifying the one or more antenna switching capabilities.

5. The method of claim 1,
wherein at least one band of the baseline carrier combination is not present in the target carrier combination based at least in part on the one or more carrier switching capabilities indicating that the at least one band is associated with an interruption for the target carrier combination.

6. The method of claim 1,
wherein the antenna switching capability for the target carrier combination is different when the UE is to temporarily switch to the target carrier combination than when the target carrier combination is to be used as the baseline carrier combination.

7. The method of claim 1, further comprising:
receiving information identifying the target carrier combination wherein the target carrier combination is not supported as the baseline carrier combination for the UE.

8. A method of wireless communication performed by a user equipment (UE), comprising:
transmitting, to a base station, information identifying one or more antenna switching capabilities and one or more carrier switching capabilities for the UE, wherein the UE is associated with a baseline carrier combination; and
receiving information identifying a target carrier combination, wherein the target carrier combination is associated with an antenna switching capability of the one or more antenna switching capabilities, wherein the target carrier combination is based at least in part on the one or more carrier switching capabilities, and wherein the target carrier combination is different than the baseline carrier combination.

9. The method of claim 8, wherein the information identifying the one or more antenna switching capabilities and the one or more carrier switching capabilities is for a reference signal.

10. The method of claim 8, further comprising:
determining the antenna switching capability for the target carrier combination.

11. The method of claim 8, wherein the target carrier combination is based at least in part on the target carrier combination being associated with the antenna switching capability.

12. The method of claim 8,
wherein the antenna switching capability for the target carrier combination is different when the UE is to temporarily switch to the target carrier combination than when the target carrier combination is to be used as the baseline carrier combination.

13. The method of claim 8, further comprising:
transmitting information identifying the target carrier combination, wherein the target carrier combination is not supported as the baseline carrier combination for the UE.

14. A base station for wireless communication, comprising:
a memory; and
one or more processors coupled to the memory, the memory and the one or more processors configured to:
receive information identifying one or more antenna switching capabilities and one or more carrier switching capabilities for a user equipment (UE), wherein the UE is associated with a baseline carrier combination; and
determine an antenna switching capability for a target carrier combination based at least in part on the one or more carrier switching capabilities, wherein the target carrier combination is different than the baseline carrier combination.

15. The base station of claim 14, wherein the target carrier combination is for transmission of a reference signal.

16. The base station of claim 14, wherein the one or more antenna switching capabilities are different for different carrier or band combinations.

17. The base station of claim 14, wherein the antenna switching capability for the target carrier combination is identified by the information identifying the one or more antenna switching capabilities.

18. A user equipment (UE) for wireless communication, comprising:
a memory; and
one or more processors coupled to the memory, wherein the one or more processors are configured to:
transmit, to a base station, information identifying one or more antenna switching capabilities and one or more carrier switching capabilities for the UE, wherein the UE is associated with a baseline carrier combination; and
receive information identifying a target carrier combination, wherein the target carrier combination is associated with an antenna switching capability of the one or more antenna switching capabilities, wherein the target carrier combination is based at least in part on the one or more carrier switching capabilities, and wherein the target carrier combination is different than the baseline carrier combination.

19. The UE of claim 18, wherein the information identifying the one or more antenna switching capabilities and the one or more carrier switching capabilities is for a reference signal.

20. The UE of claim 18, wherein the one or more processors are further configured to:

determine the antenna switching capability for the target carrier combination.

21. The UE of claim 18, wherein the target carrier combination is based at least in part on the target carrier combination being associated with the antenna switching capability.

22. The UE of claim 18, wherein the antenna switching capability for the target carrier combination is different when the UE is to temporarily switch to the target carrier combination than when the target carrier combination is to be used as the baseline carrier combination.

23. The UE of claim 18,
wherein the one or more processors are further configured to:
transmit information identifying the target carrier combination, wherein the target carrier combination is not supported as the baseline carrier combination for the UE.

24. The UE of claim 18,
wherein the information identifying the target carrier combination identifies one or more bands of the target carrier combination as switched relative to the baseline carrier combination.

25. The UE of claim 24, wherein the antenna switching capability is based at least in part on the one or more bands of the target carrier combination that are switched.

26. The UE of claim 18,
wherein the information identifying the target carrier combination identifies one or more bands of the baseline carrier combination that correspond to the one or more bands of the target carrier combination as switched.

27. The UE of claim 26, wherein the antenna switching capability is based in part on the one or more bands of the baseline carrier combination.

28. The UE of claim 18, wherein the one or more processors are further configured to:
receive information identifying a baseline carrier configuration, wherein the baseline carrier configuration identifies one or more first carriers configured for downlink communication and not for uplink communication, and wherein the baseline carrier configuration identifies one or more second carriers configured for uplink communication and downlink communication; and
receive information identifying a switching configuration, wherein the switching configuration is for the UE to transmit a physical channel or signal in one or more carriers of the one or more first carriers based at least in part on interrupting one or more carriers of the one or more second carriers, and
wherein the target carrier combination is determined based at least in part on one or more of the baseline carrier configuration or the switching configuration.

29. The UE of claim 18, wherein the information identifying the target carrier combination identifies a band of the target carrier combination relative to a band of the baseline carrier combination.

30. The UE of claim 18, wherein the information identifying the target carrier combination identifies a switched relationship between a band of the target carrier combination and a band of the baseline carrier combination.

\* \* \* \* \*